(12) United States Patent
Gietenbruch et al.

(10) Patent No.: US 8,648,719 B2
(45) Date of Patent: Feb. 11, 2014

(54) CONTAINER UNIT FOR THE SHIPPING, STORAGE AND PROTECTION OF LABORATORY SUBSTANCES

(75) Inventors: Matthias Gietenbruch, Buchs (CH); Sandra Ehrbar, Gutenswil (CH)

(73) Assignee: Mettler-Toledo AG, Greifensee (CH)

( * ) Notice: Subject to any disclaimer, the term of this patent is extended or adjusted under 35 U.S.C. 154(b) by 763 days.

(21) Appl. No.: 12/562,171

(22) Filed: Sep. 18, 2009

(65) Prior Publication Data

US 2010/0007493 A1 Jan. 14, 2010

Related U.S. Application Data

(63) Continuation of application No. PCT/EP2008/053764, filed on Mar. 28, 2008.

(30) Foreign Application Priority Data

Apr. 10, 2007 (EP) .................................... 07105842

(51) Int. Cl.
*B65B 31/00* (2006.01)
*B65B 3/00* (2006.01)
*B65D 21/02* (2006.01)

(52) U.S. Cl.
USPC ............... 340/540; 53/79; 53/510; 53/274; 53/286; 206/0.6; 206/730; 206/219; 206/229; 220/23.83; 220/500; 220/130

(58) Field of Classification Search
USPC .......... 137/206, 209, 211; 141/18, 21–24, 86; 220/582, 583, 23.83, 23.87, 23.88, 220/23.89, 500–557; 222/179.5, 235, 108, 222/130; 138/89; 53/79–110, 510–512, 53/274, 286; 206/0.7, 730–735, 219–222, 206/229–230

See application file for complete search history.

(56) References Cited

U.S. PATENT DOCUMENTS

| 3,943,987 | A | | 3/1976 | Rossi |
| 4,124,044 | A | * | 11/1978 | Nugent ........................... 141/98 |
| 5,217,050 | A | * | 6/1993 | Varlet ................. 141/2 |
| 5,394,789 | A | * | 3/1995 | Evans et al. .................... 99/345 |
| 5,498,543 | A | * | 3/1996 | Berndt ........................ 435/286.1 |
| 6,043,097 | A | * | 3/2000 | Dumitrescu et al. ............ 436/48 |
| 6,176,238 | B1 | | 1/2001 | McDerment |

(Continued)

FOREIGN PATENT DOCUMENTS

| DE | 19831519 C2 | 1/2002 |
| EP | 1325874 B1 | 3/2007 |
| FR | 998154 A | 1/1952 |

*Primary Examiner* — Daniel Wu
*Assistant Examiner* — John Bamert
(74) *Attorney, Agent, or Firm* — Standley Law Group LLP

(57) ABSTRACT

A container unit for the storage and protection of laboratory substances includes a protective housing and at least one dosage-dispensing unit. The at least one dosage-dispensing unit includes a reservoir container and a dispensing head. To prepare the at least one dosage-dispensing unit for operation, the protective housing can be removed from the dosage-dispensing unit. The protective housing has a bottom part with at least one suitably shaped recess to provide a stable seat for the at least one dosage-dispensing unit, as well as a bell-shaped top. The top can be connected to the bottom part, so as to form a tightly sealed interior space. For transportation and storage purposes, the at least one dosage-dispensing unit is arranged in the interior space of the closed protective housing.

18 Claims, 4 Drawing Sheets

(56) References Cited

U.S. PATENT DOCUMENTS

| | | | | |
|---|---|---|---|---|
| 6,502,701 | B2 * | 1/2003 | Shinada | 206/723 |
| 6,599,476 | B1 * | 7/2003 | Watson et al. | 422/63 |
| 7,832,184 | B2 * | 11/2010 | Sillince | 53/420 |
| 2001/0032799 | A1 | 10/2001 | Shinada | |
| 2003/0021727 | A1 | 1/2003 | Weyker et al. | |
| 2004/0044439 | A1 | 3/2004 | Gueller et al. | |
| 2005/0269322 | A1 | 12/2005 | Betras et al. | |
| 2006/0011653 | A1 | 1/2006 | Fontaine et al. | |
| 2007/0006942 | A1 | 1/2007 | Pluvinage et al. | |
| 2007/0114140 | A1 | 5/2007 | Portier | |
| 2008/0072993 | A1 | 3/2008 | Luchinger et al. | |

* cited by examiner

CONTAINER UNIT FOR THE SHIPPING, STORAGE AND PROTECTION OF LABORATORY SUBSTANCES

CROSS-REFERENCE TO RELATED APPLICATIONS

This application is a continuation under 35 USC §120 of PCT/EP2008/053764, filed 28 Mar. 2008, which is in turn entitled to benefit of a right of priority under 35 USC §119 from European patent application 07 10 5842.4, filed 10 Apr. 2007. The content of each of the applications is incorporated by reference as if fully recited herein.

TECHNICAL FIELD

The disclosed embodiments relate to a container unit for the storage and protection of powders and pastes in quantities that are typical for laboratory applications.

BACKGROUND OF THE ART

In companies with regional or global operations, where new substances are developed and intermediate products as well as samples from production processes are analyzed, a large portion of the time is consumed throughout the entire workflow for the logistics processes that are required in order to dispense these substances in measured doses from source containers into receiving containers at different locations in the laboratory or also in different laboratories that are dispersed worldwide. Particularly in the case of hazardous materials, for example toxic or carcinogenic substances, the required safety measures are very time-consuming and expensive. The cost for a large dosage-dispensing system with an automatic feeder device to move the substance cannot be justified for this kind of application, because such systems are very expensive.

Therefore, in order to make the workflow more efficient, there is a need for lower-cost dosage-dispensing instruments, so that a larger number of these instruments can be placed in different respective locations. Such dosage-dispensing instruments are particularly advantageous if they are configured as retrofittable units which can be used in high-precision analytical balances. A dosage-dispensing unit is disclosed in FR 2 846 632 A1 which can be coupled to and uncoupled from an actuating device. The dosage-dispensing device consists in essence of a reservoir container which is connected to the dispensing head. The dispensing head has an outlet opening which can be opened and closed by means of a slider valve. To store the dosage-dispensing unit with the substance contained in it, the entire dispensing head, specifically its openings, can be closed off from the outside with a protective push-on cap. The dosage-dispensing unit as disclosed is suitable for use in so-called compound libraries, i.e. very large substance repositories with defined and controlled climatic conditions.

However, if the dosage-dispensing units are to be mailed out worldwide, special attention needs to be paid to the protection of the dosage-dispensing unit and the substance contained in it, for example with measures against the penetration of moisture or dirt and to avoid personal accidents which could be caused for example by toxic substances.

With the aim of protecting the integrity of the substance and to avoid the risk of personal accidents, the disclosed embodiments therefore have the objective to create a container unit for laboratory substances:
which is safe and simple to handle
which protects the substance contained in it from outside influences, for example moisture and contaminants,
which prevents personal accidents which could be caused for example by substance escaping from the dosage-dispensing unit, and also prevents unauthorized withdrawals of laboratory substances, and
which can be equipped with means to hold information regarding the properties and the condition of the substance contained in the dosage-dispensing unit.

SUMMARY

The objectives just named are met by a laboratory container unit for the storage and protection of laboratory substances in accordance with the independent device claim.

A laboratory substance container unit for the storage and protection of laboratory substances comprises a protective housing and at least one dosage-dispensing unit. The at least one dosage-dispensing unit includes a reservoir container and a dispensing head. To prepare the at least one dosage-dispensing unit for operation, the protective housing can be removed from the dosage-dispensing unit. The protective housing comprises a bottom part with at least one suitably shaped recess to provide a stable seat for the at least one dosage-dispensing unit, as well as a bell-shaped top. The top can be connected to the bottom part, so as to form a tightly sealed interior space. For transportation and storage purposes the at least one dosage-dispensing unit is arranged in the interior space of the closed protective housing.

"Tightly sealed", as used in this patent application, means that the protective housing in the closed state prevents at least the escape of laboratory substance into the environment, as well as the entry of dirt from the environment into the interior space of the protective housing. However, the protective housing is preferably gas-tight, so that for example the penetration of moisture into the interior space can be prevented and, consequently, outside influences can also be kept away from the laboratory substance.

Preferably, the top is connected to the bottom part by means of a narrow-pitched screw thread connection, a bayonet coupling with a detent element, or by means of clamp-on closure elements which can be secured with tamper-proof seals. The protective housing has the primary function to form a shield between the surrounding space and the laboratory substance inside the dosage-dispensing unit, in particular to block leak passages in the dispensing head. This barrier is necessary, because it is almost impossible to make the dispensing head permanently air-tight. The potential leak passages which lead through the dispensing head into the reservoir container include in particular the outlet opening as well as bore holes that may be arranged in the dispensing head for the coupling connection to a flow rate control device as well as the connection between the dispensing head and the reservoir container. The protective housing further performs the function of a barrier wall surrounding the dispensing head, so that substance particles which could remain stuck to the outside of the dispensing head in the area of the outlet opening after the dispensing process will remain safely locked away in the interior space of the protective housing and pose no danger to people and the environment.

If the bottom part has a flat underside, this flat underside will form a stable base for the laboratory substance container unit to stand on.

If the at least one recess has a shape that is adapted to the dosage-dispensing head and the bottom part has a flat underside, the bottom part by itself forms a stable seat for at least one dosage-dispensing unit.

Accordingly, it is possible that the interior space of the protective housing accommodates more than one dosage-dispensing unit. In order to prevent cross-contamination between different laboratory substances, the interior space of the protective housing is preferably configured in such a way that only one dosage-dispensing unit can be enclosed. The interior space may also be subdivided, so that only one dosage-dispensing unit can be enclosed in each subdivision of the interior space.

In order to keep the dosage-dispensing unit securely seated in the recess when the protective housing is closed, the bell-shaped top can have a securing portion by means of which the dosage-dispensing unit can be secured. The securing portion prevents that the dosage-dispensing unit can move in the protective housing and that by inappropriate handling of the laboratory substance container unit, the dosage-dispensing unit could get destroyed inside the protective housing. As soon as the top is separated from the bottom part, the at least one dosage-dispensing unit can be lifted out of the recess without any problem. Of course, it would also be possible to use other securing means, for example clamps, hooks and lugs to hold the dosage-dispensing unit firmly seated in the recess.

In order to make the handling as simple and safe as possible and to provide the required protection for the substance contained inside, there is preferably at least one chamber formed in the protective housing which is filled with a treatment agent. The at least one chamber has a passage opening directed towards the interior space.

The passage opening can advantageously be closed gas-tight with a chamber closure element. The treatment agent contained in the chamber can thus be filled into the chamber already during the process of producing the protective housing and can be sealed gas-tight with the chamber closure element.

While laboratory containers that can be closed gas-tight, wherein for example small bags with desiccant agents are enclosed directly with the substance, are known to be in daily use, the arrangement according described herein offers enormous advantages over this conventional storage concept.

The treatment agent is always spatially separated from the laboratory substance, so that no problems occur with the treatment agent when taking out laboratory substance and in the handling of the laboratory substance container unit. Furthermore, the treatment agent is already in place and in faultless, for example unsaturated condition at the time when the chamber closure element of the protective housing is opened immediately prior to connecting the top to the bottom part, whereby the treatment agent is allowed to take effect.

If a chamber closure element in a protective housing is found already open, this would indicate unmistakably that the protective housing was already in use, so that the treatment agent is possibly saturated and therefore no longer effective, and that the inside of the protective housing may possibly be contaminated. It can therefore be of advantage if the chamber closure element is designed so that it cannot be closed again. For example, a tear-off tag formed on the protective housing or a tear-off sealing sticker could be used as a chamber closure element.

Of course, the chamber closure element could be designed according to any feasible functional principle and could for example be a hinged lid or a rotary closure element which can be opened and closed by tilting or turning.

Different treatment agents may be employed, depending on the laboratory substance that is to be stored. Substances that are known to be used as treatment agents are for example binding agents such as silica gel, molecular sieve, activated charcoal, and activated clay (potassium bentonite). However, the treatment agent does not necessarily have to be a binding agent. It is also absolutely possible to fill the chamber with treatment agents which for example bind or displace oxygen from the air. When using displacing treatment agents, there is of course an outlet required from the interior space to the outside, for example a pressure relief valve. The treatment agent is preferably present in solid form, but of course it can also be filled into the chamber as a liquid or gas, in which case the chamber closure element and the passage opening has to be designed in accordance with the state of aggregation of the treatment agent. For special solutions it is even conceivable to fill reaction components into the chambers which are intentionally planned to cause a change of the laboratory substance in the reservoir container during the storage time. Such special solutions could be used for example in aging tests, by filling the chamber for example with water or even with an oxygen carrier such as potassium nitrate instead of the treatment agent.

The passage opening can of course be configured in very different ways. It is preferably designed so that no treatment agent can escape through the passage opening into the interior space, but that the passage opening still allows gas to pass through. When coarse-grain silica gel is used, it is sufficient to use for example a sieve insert, while in the case of finer powders, it is preferred to arrange a gas-permeable membrane or a tissue in the passage opening.

If the same protective housing is to be used more than once, it can have more than one chamber, with each chamber having its own chamber closure element. In one possible embodiment, each of these chambers can be filled with a different treatment agent, so that the one treatment agent that is specifically suitable for the laboratory substance can be activated by opening the respective chamber closure element. Of course each chamber closure element can be provided with appropriate directions for use. It is of course possible to activate several treatment agents at once by removing more than one chamber closure element.

Especially in large substance storage systems, the advantage of being able to monitor the stored substances individually cannot be overestimated. In order to make it possible to check the condition of the treatment agent or of the laboratory substance, there can be at least one indicator and/or sensor arranged in the at least one chamber and/or in the interior space and/or, if applicable, in the lid chamber. The sensor can be a humidity sensor, a pressure sensor, a gas sensor, or an optical sensor.

The at least one sensor preferably has a wireless or wire-bound connection to a monitoring unit that is arranged inside or outside the laboratory substance container unit. The externally arranged monitoring unit can be connected to the substance storage management system. As soon as irregularities occur with a laboratory substance container unit, it is conceivable that for example the robot that is tied into the substance storage management system could automatically be dispatched to fetch the laboratory substance container unit in question and put it into an output or disposal station.

In case the chamber is equipped with an observation window and an indicator, the condition of the treatment agent or the conditions existing in the interior space of the laboratory substance container unit can also be verified optically. Such an indicator can be a treatment agent such as for example silica gel, which changes its color from blue to red as soon as it has reached a certain degree of moisture saturation. The monitoring unit described above could in this case monitor the condition of the treatment agent by means of an optical sensor, where the optical sensor would not even need to be arranged in the interior of the laboratory substance container unit, but could register the color change through the observation window. The optical sensor can in this case be permanently installed in the parking location of a laboratory substance container unit.

Of course, the reservoir container and/or at least a housing component of the dispensing head and/or the protective housing can be made of a transparent material. This provides a problem-free way to check how much substance remains in the laboratory substance container unit. It can further be verified whether the dispensing head is still tightly sealed or whether laboratory substance is already present in the interior space of the protective housing or in the recess, so that there will be a danger of contamination when the protective housing is removed.

As a means to protect the laboratory substance filled into the laboratory substance container unit from harmful radiation from the environment, the transparent material can have filter properties for certain wavelengths of light, or it can be coated with a material having such filter properties. A conventional solution is for example the use of brown glass, which has the requisite filter properties.

If the coated material with the filter properties is arranged in the interior space, it can also have the properties of an indicator. For example, if the relative air humidity in the interior space is too high, the coating material could change color as a result of the humidity or it could even loose its transparency. The coating material itself can also absorb part of the humidity and can thus serve as a treatment agent.

In addition to the chambers, the protective housing can have at least one gas inlet and/or a vacuum connection which is equipped with a check valve and can be connected to a gas supply source or a vacuum pump. The connection of the protective housing to the gas supply source or the vacuum pump can be maintained during an initial storage period or can be in place for only a short period for filling or evacuating. With the gas supply or the vacuum pump, the interior space of the protective housing can be filled with either a gas atmosphere or with a sub-ambient atmospheric pressure, which also propagates through the dispensing head into the reservoir container and replaces the air in the dosage-dispensing unit. This allows for example the useful life of the treatment agent in the at least one chamber to be influenced. A sub-ambient atmospheric pressure or partial vacuum in the protective housing and in the dosage-dispensing unit can function as an additional safety measure, because in case of a leak, air will penetrate into the laboratory substance container unit, but no substance will be able to escape to the outside. A hermetic (gas-tight) closure is necessary in order to be able to maintain the gas atmosphere or the partial vacuum in the interior of the container unit. The container unit as well as the reservoir container will of course have to be designed to have sufficient strength to withstand the pressure.

In addition to or instead of the gas connection, the protective housing can further contain at least one gas cartridge which can be actuated from the outside to flood the interior space with gas. The actuation from the outside implies that the dosage-dispensing unit is first covered with the protective housing, and the valve of the gas cartridge is operable for example through a push button or rotary knob that is accessible from the outside. Depending on its design, the valve of the gas cartridge can be opened irreversibly, or it can be capable of being closed again. If the valve of the gas cartridge can be closed again, this makes it possible that when the protective housing is removed more than once, the interior space can be flooded with gas again each time after the laboratory substance container unit has been reassembled. As an advantageous feature, there should be an opening with a check valve, so that the air displaced by the gas of the cartridge can escape from the interior space to the outside. Such an opening can also be represented by the connection between the protective housing and the dosage-dispensing unit if the housing expands under the inside pressure to such an extent that during a short time a leak will occur through the connection, so that the excess pressure in the interior space can be released through this leak.

Due to the conforming shape of the at least one recess, it is possible that dosage material which clings to the outside of the dispensing will accumulate in the recess and remain captive in the recess as long as the dispensing head is seated in the recess. The recess can preferably contain an insert which binds the laboratory substance particles. Such an insert could be for example a felt insert or a micro fiber insert which electrostatically attracts the laboratory substance particles. Of course, one could also use other kinds of inserts such as a moist sponge, a suction device, rotating cleaning brushes and the like.

In a further embodiment, there can be a means of identification arranged on the reservoir container and/or on the dispensing head and/or on the protective housing. This identifier means is preferably an RFID tag, a barcode or matrix code label, or a printed or handwritten adhesive label.

As a further safety element, the laboratory substance container unit can be sealed with a tamper-proof security label or tamper-proof seal, which is designed so that it has to be visibly broken in order to remove the dosage-dispensing unit from the protective housing.

Of course, the handling of the laboratory substance container unit described above can be automated by means of a laboratory robot. To implement this concept, the laboratory robot could perform the processes that will now be described.

In a method to fill, transport and store a laboratory substance container unit:
   the reservoir container of the dosage-dispensing unit is filled with a laboratory substance and the dispensing head is connected to the reservoir container;
   the dosage-dispensing unit is set into the recess of the bottom part, the chamber closure element of a passage opening is removed or opened, and the dosage-dispensing unit is enclosed in the protective housing by connecting the bottom part with the top;
   the laboratory substance container unit is appropriately identified, possibly sealed, and put into storage or sent to its destination.

In a method to dispense substance from a filled laboratory substance container: by separating the top from the bottom part, the protective housing is removed from the dosage-dispensing unit;
   the dosage-dispensing unit is connected to an actuating device and is moved into position above a receiving container;
   the dosage-dispensing process is started;
   after the prescribed substance quantity has been dispensed into one or more receiving containers, the dosage-dispensing unit is removed from the actuating device;
   the dosage-dispensing unit is set into the recess of the bottom part, the chamber closure element of at least one passage opening is removed or opened, the dosage-dispensing unit is enclosed in the protective housing by connecting the bottom part with the top; and
   the laboratory substance container unit is returned to storage or is disposed of.

As has been described, there can be a monitoring unit for the surveillance of one or more laboratory substance container units. A method to monitor a laboratory substance container unit which has been filled and put into storage can have the following steps:

- a measurement signal connection from the sensor to the monitoring unit is maintained continually or periodically, or is initialized by way of a user input;
- measurement signals delivered continually or periodically or at one time by the sensor are received and recorded by the monitoring unit;
- at least one measurement signal received by the monitoring unit, or a measurement value obtained from the measurement signal, is compared to at least one threshold value that is stored in the monitoring unit;
- if the threshold value is found to be exceeded, a warning signal is transmitted to an output unit that belongs to the monitoring unit, or to the indicator.

As can be concluded from the preceding description, the indicator is not necessarily a substance which indicates a change for example by a turn in color. An indicator can also be an electronic component which includes a monitoring unit and an output unit as well as possibly a sensor. The threshold value represents a border of a kind where the laboratory substance contained in the laboratory substance container unit can be negatively affected when the value is exceeded. For example, it is possible that in a certain pulverous laboratory substance a relative humidity of 0% to 15% in the interior space has no influence on the ability of the substance to flow freely, but that individual powder particles will begin to stick together as soon as a value of 15% is exceeded. The threshold value in this example would thus be 15%.

As a further possibility, a limit value could be defined, for example a maximally permissible temperature, where the total destruction of the laboratory substance will have to be assumed if the limit has been exceeded. As a second example if a threshold value is set at a lower temperature than the limit value at which the laboratory substance begins to break up, it would be possible to calculate the remaining useful lifetime for the laboratory substance by keeping track of multiple incidents when the threshold value was exceeded and for how long, and by keeping a running cumulative total of the time during which the temperature was above the threshold.

BRIEF DESCRIPTION OF THE DRAWINGS

Details of the laboratory substance container unit will become apparent from the description of the embodiments illustrated in the drawings, wherein identical parts are identified with identical part numbers and wherein.

DETAILED DESCRIPTION OF THE EMBODIMENTS

Figure 1:
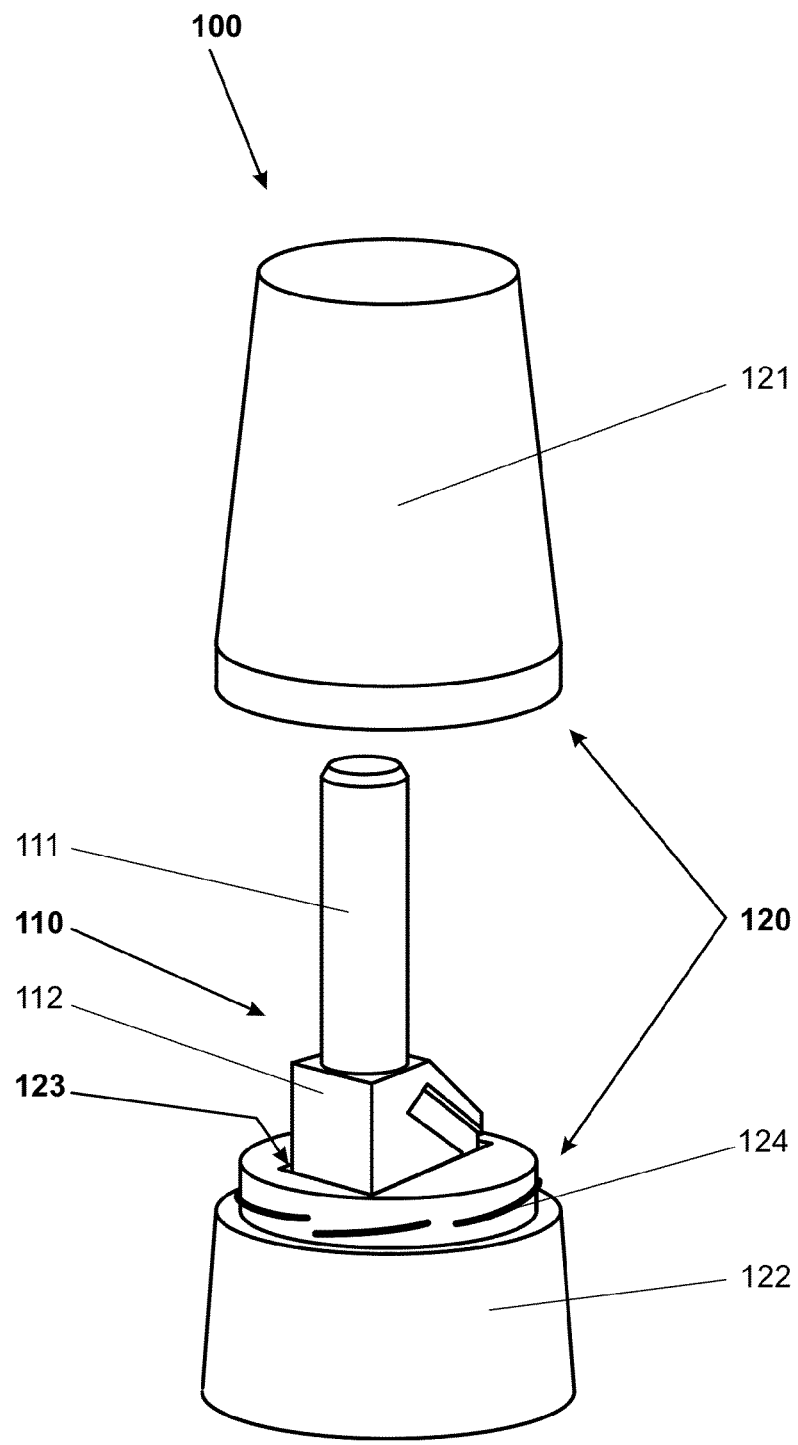
FIG. 1 is a perspective view of a first embodiment laboratory substance container unit, wherein the dosage-dispensing unit is set into a recess of the bottom part of the protective housing and the bell-shaped top is lifted off the bottom part.

The laboratory substance container unit 100 in FIG. 1 represents a first embodiment. A dosage-dispensing unit 110 includes a slender cylindrical reservoir container 111 and a dispensing head 112 which are joined together by means of a screw connection. The dispensing head 112 can be based on any known functional principle, for example a cone valve, a conveyor screw, a sieve insert, a slider gate and the like. The specific configuration of the dispensing head 112 can therefore be arbitrarily chosen as it is irrelevant for the disclosed concept to be operative.

The laboratory substance container unit 100 further includes a protective housing 120 which has two parts. The protective housing 120 has a bottom part 122 and a top 121. The junction between the top 121 and the bottom part 122 is equipped with a multi-ramped screw thread 124. Through this connection, the top 121 can be joined firmly to the bottom 122. The bottom part 122 further has a recess 123 which conforms to the outside contours of the dispensing head 112, so that the dosage-dispensing unit 110 can be set in its normal orientation into the bottom part 122. The top 121 of the protective housing 120, which is set over the dosage-dispensing unit 110 after the latter has been seated in the bottom part 122, is configured in essence as a bell-shaped bonnet or an inverted cup. Instead of the screw thread 124, it is of course also possible to use other suitable means of connection, for example snap closure devices or clamping claws and the like. The connection preferably includes sealing means, which will be described in more detail in the context of FIG. 2.

In this first embodiment, the top 121 as well as the test-tube-shaped reservoir container 111 are preferably made of transparent material, so that the laboratory substance can be checked visually without problems.

Figure 2:
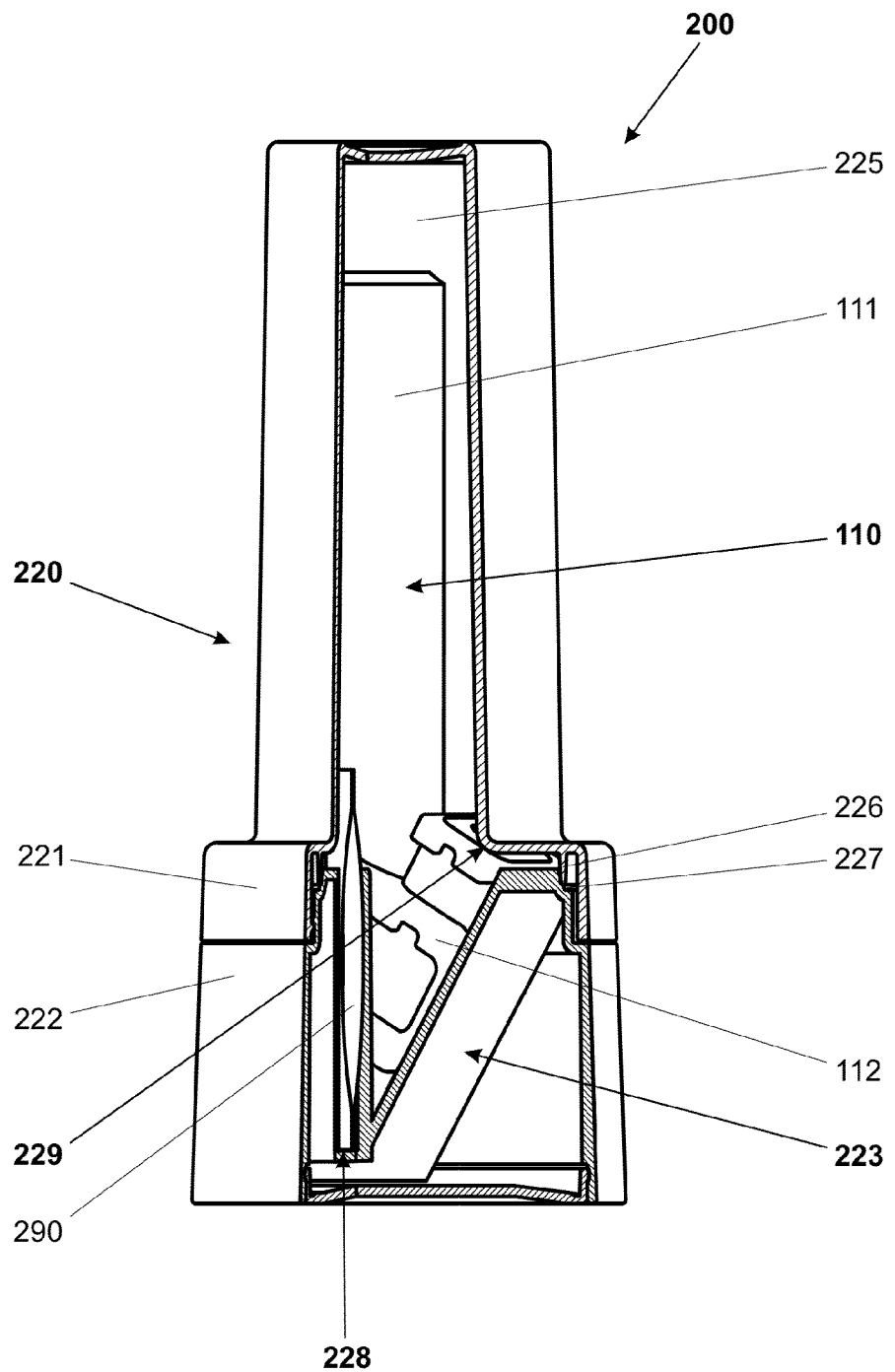
FIG. 2 is a side partial sectional view of a empty second embodiment of a laboratory substance container unit, in an assembled state, with a dosage-dispensing unit arranged in the interior space.

FIG. 2 shows a laboratory substance container unit 200 according to a second embodiment in a partially sectional view, wherein a dosage-dispensing unit 110 is arranged in the interior space 225 of the assembled protective housing 220.

Unlike the top shown in FIG. 1, the top 221 in FIG. 2 has a stepped contour which provides a securing portion 229. This securing portion 229 bears against the dispensing head 112 of the dosage-dispensing unit 110 in such a way that the dispensing head is held captive in the recess 223 of the bottom part 222. This design feature allows the dosage-dispensing unit 110 to be secured in the interior space 225 regardless of the length of the reservoir container 111, so that the length of the reservoir container does not have to be matched to the top 221.

So that the two-part protective housing 220 can be sealed gas-tight, the bottom part 222 has a frusto-conical sealing shoulder 227. The top 221 has a ring-shaped sealing lip 226 whose internal diameter conforms to the sealing shoulder 227 in such a way that when the top 221 is joined to the bottom part 222, the sealing lip 226 is stretched and/or the sealing shoulder 227 is compressed. This implies that at least the sealing lip 226 and/or the sealing shoulder 227 should consist of an elastic material.

The bottom part 222 further contains a chamber 228 which can accommodate a pouch with a treatment agent 290. To secure the pouch, there can be a fastening means (not shown in the drawing) arranged at the open end of the chamber 228. However, the pouch could also be adhesively secured in the chamber 228, or its dimensions could be such that it remains stuck in the chamber due to sufficient static friction.

Figure 3:
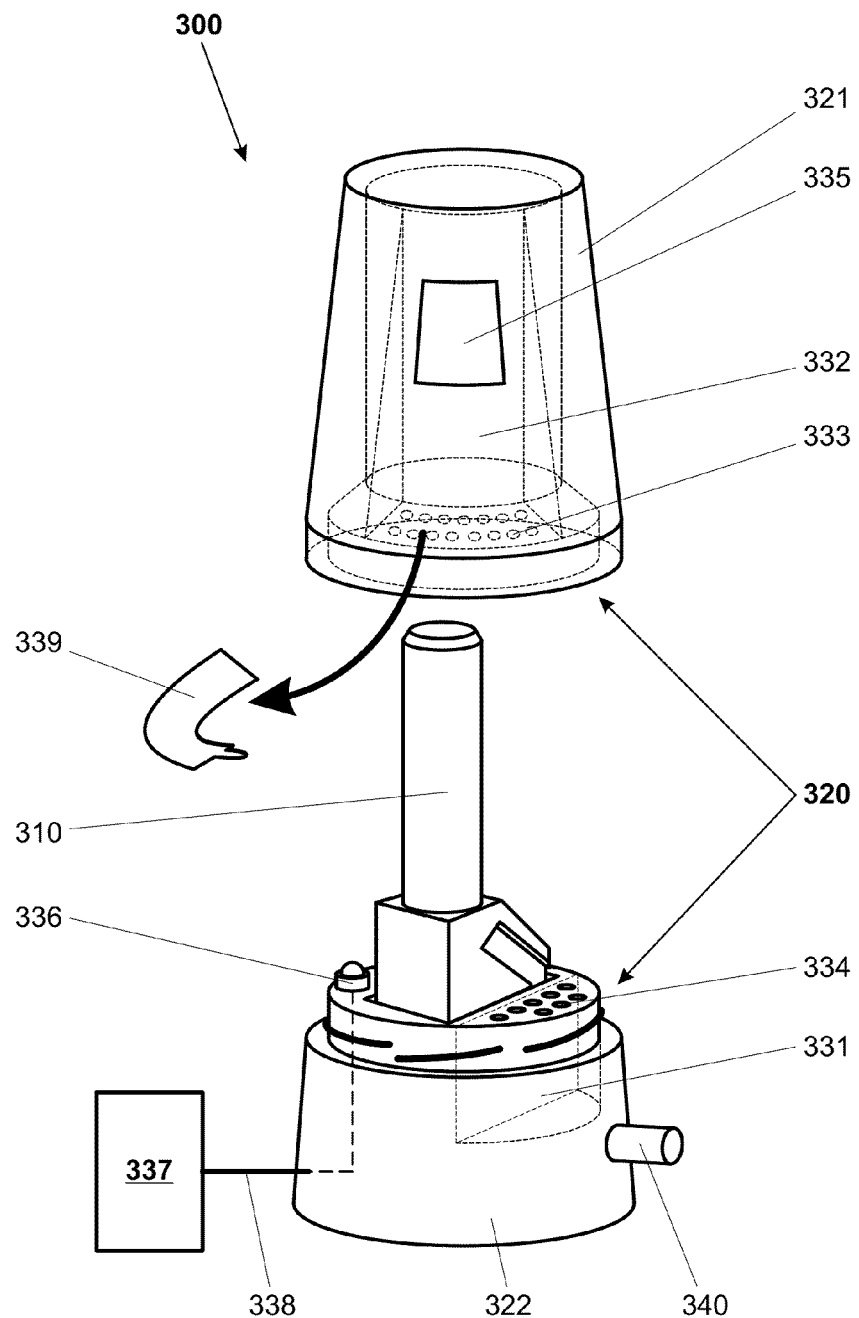
FIG. 3 is a perspective view of a third embodiment laboratory substance container unit, wherein chambers are formed in the bottom part and in the top, and wherein the arrangement includes a monitoring unit, a sensor and a gas connector port.

FIG. 3 represents a three-dimensional view of a laboratory substance container unit 300 in a third embodiment. In the bottom part 322 as well as in the top 321 of a protective housing 320, chambers 331, 332 are formed which are indicated by dotted lines. Each of the chambers 331, 332 has a passage opening 333, 334, respectively, which is directed towards the interior space. The chambers 331, 332 can be filled with a treatment agent. The passage openings 333, 334 can be designed so that they can be closed with a chamber closure element 339. The chamber closure element 339 shown in FIG. 3 is an adhesive label which has been removed from the passage opening 333. Of course, it is also possible to use different chamber closure elements 339, for example of a kind that can be closed again.

As a means to allow the condition of the treatment agent to be checked, there can be an indicator arranged in the chamber 331, 332 or in the interior space of the protective housing 320. In order to be able to visually check the indicator or the treatment agent, the protective housing 320 can be made of a transparent material or can at least have an observation window 335.

The indicator does not necessarily have to be an element that is perceived visually such as for example silica gel or a litmus paper which turns color. The indicator can also be a sensor 336 which can be connected to a monitoring unit 337 by means of a physical and/or wireless connection 338. Based on the measurement signal of the sensor 336, the monitoring unit 337 can register the condition of the treatment agent or the atmospheric conditions inside the protective housing 320 and determine from this information the state of the laboratory substance, the treatment agent and also, if applicable, the condition of the dosage-dispensing unit 310, without requiring the protective housing 320 to be opened. The measurement signals and measurement results of the sensor 336 could possibly also be used to determine an expiration date of the laboratory substance, which would be dependent on the storage conditions (calculation of the remaining shelf life of the laboratory substance).

As a means to maximize the shelf life of the laboratory substance in the laboratory substance container unit 300, the protective housing 320 can further have a gas connector port 340. This gas inlet 340 allows for example a protective gas to be brought into the interior space. The gas connector port 340 can also be used to generate a sub-ambient atmospheric pressure in the interior space. Due to the pressure difference against the ambient pressure, it will be impossible or at least difficult to inadvertently open the protective housing 320, which provides an additional degree of protection.

Figure 4:
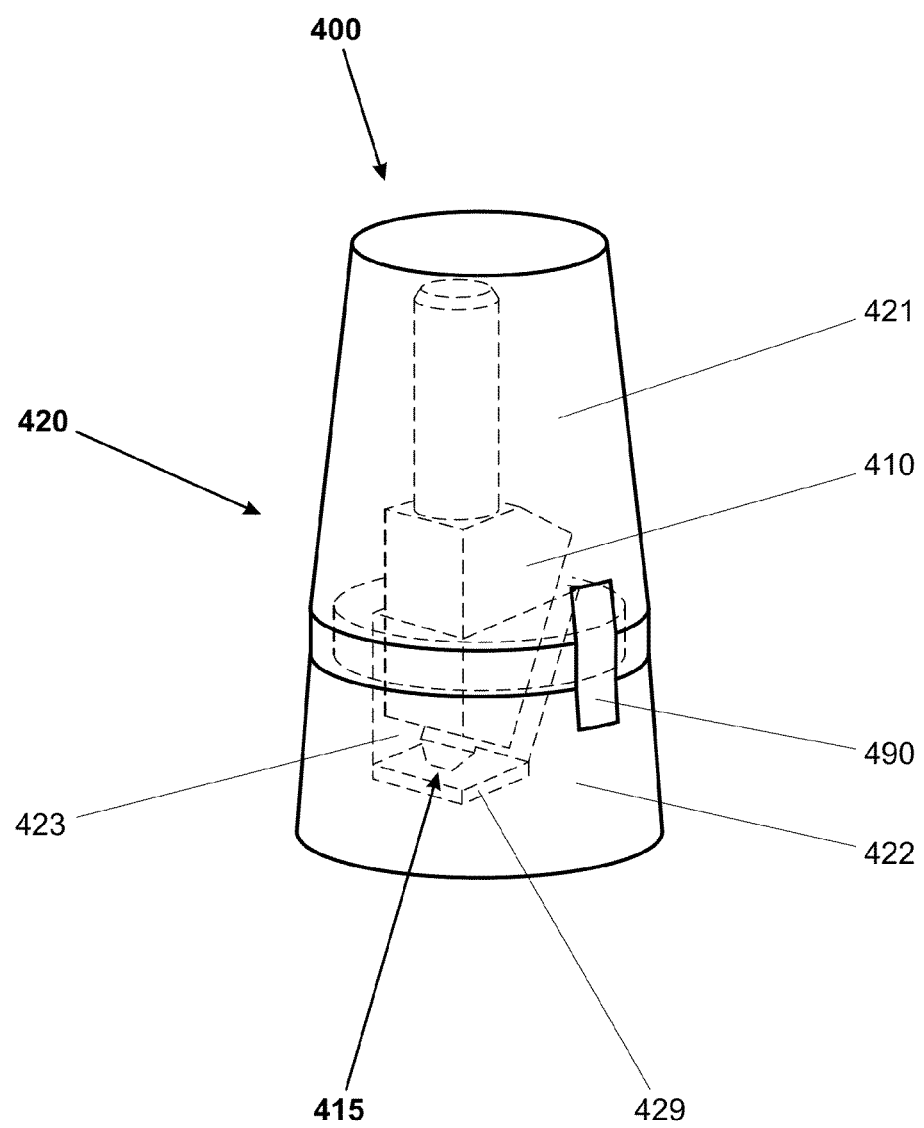
FIG. 4 shows an assembled laboratory substance container unit according to the first and third embodiments, ready for storage or transportation.

The laboratory substance container unit 400 shown in FIG. 4 is substantially analogous to the laboratory substance container units in FIGS. 1 and 3, but is illustrated in the closed state. A dosage-dispensing unit 410 (drawn in broken lines) is arranged in the interior of the protective housing 420. A protective label 490 or a so-called tamper-proof seal is attached across the joint between the bottom part 422 and the top 421 of the protective housing 420. FIG. 4 further shows the position of the outlet opening 415 of the dosage-dispensing unit 410. As is also clearly evident, the recess 423 in the bottom part 422 encloses the outlet opening 415 and serves as a catch receptacle for laboratory substance particles which could cling to the border area of the outlet opening 415. The recess 423 can possibly contain an insert 429 which binds the laboratory substance particles. Such an insert 429 could for example be a felt insert or a micro fiber tissue insert which attracts the laboratory substance particles electrostatically.

Although the invention has been presented though specific examples of embodiments, there are obviously numerous further variations that could be created from a knowledge of the present invention, for example by combining the features of the individual embodiments with each other and/or by exchanging individual functional units of the embodiments against each other. For example, the monitoring unit shown in FIG. 3 as well as the sensor associated with it, or possibly several sensors which are used to measure different parameters, can also be used in all of the other laboratory substance container units. Further embodiments of the dosage-dispensing head are conceivable with respect to different closure means and with respect to the outlet opening, as well as different possibilities and solutions for a form-locking connection between the dosage-dispensing unit and the protective housing.

What is claimed is:

1. A container unit for transportation, storage and protection of a laboratory substance, comprising:
   a protective housing, comprising a bottom part with at least one recess and a top that selectively connects to the bottom part to form a gas tight sealed interior space surrounding the recess;
   a chamber for receiving a treatment agent, formed in at least one of the bottom part or in the top of the protective housing and separate from the interior space;
   a passage opening, directed towards the interior space and connecting the chamber thereto;
   a dosage-dispensing unit, sized and adapted to be selectively seated in a stable manner in the recess of the interior space with the top and bottom part connected, the dosage dispensing unit comprising a reservoir container in which the laboratory substance is contained and a dispensing head having an outlet opening that selectively retains the laboratory substance in the reservoir container, such that the dosage-dispensing unit is separated from the protective housing to dispense the laboratory substance; and
   on the protective housing, at least one of a gas connector port and a vacuum connector port, wherein each connector port, whether for gas or vacuum, is connected to a check valve, so that a gas atmosphere or a sub-ambient atmospheric pressure can be repeatedly established in the interior space.

2. The container unit of claim 1, wherein:
   the dispensing head of the dosage-dispensing unit is sized and adapted to be selectively seated in the recess.

3. The container unit of claim 1, further comprising:
   a securing portion of the protective housing top that secures the dosage-dispensing unit in the recess when the protective housing is closed.

4. The container unit of claim 1, further comprising:
   a flat bottom of the protective housing that forms a stable base on which the container unit stands.

5. The container unit of claim 1, further comprising:
   a closure element for providing a gas-tight seal of the chamber in the passage opening.

6. The container unit of claim 1, further comprising at least one of:
   an indicator; and
   a sensor,
   either or both of which are arranged in at least one of: the chamber and the interior space.

7. The container unit of claim 6, wherein:
   the sensor is present and is communicated to a monitoring unit, either physically, or by wireless connection.

8. The container unit of claim 1, further comprising:
an observation window on the chamber.

9. The container unit of claim 1, wherein:
at least one of: the reservoir container, at least a housing part of the dispensing head, the top and the bottom part is made of transparent material.

10. The container unit of claim 9, wherein:
the transparent material inherently filters light of certain wavelengths.

11. The container unit of claim 9, wherein:
the transparent material filters light of certain wavelengths due to a coating thereon that is arranged in the interior space that possesses at least one of: indicator properties and treatment agent properties.

12. The container unit of claim 1, further comprising:
a gas cartridge, in communication with the protective housing to selectively flood the interior space when actuated.

13. The container unit of claim 1, further comprising:
an identifier means, connected to at least one of: the reservoir container, the dispensing head and the protective housing, the identifier means selected from the group consisting of: an RFID tag, a barcode- or matrix code label, a printed adhesive label and a hand-written adhesive label.

14. The container unit of claim 1, further comprising:
a tamper-proof protective label that has to be visibly broken to remove the dosage-dispensing unit from the protective housing.

15. The container unit of claim 1, further comprising:
an insert in the recess to bind particles of the laboratory substance.

16. A method for filling, transporting and storing a laboratory substance container unit, comprising the steps of:
providing a container unit according to claim 1;
filling at least partially the reservoir container of the dosage-dispensing unit with the laboratory substance, and connecting the dispensing head to the at least partially-filled reservoir container;
setting the at least partially-filled dosage-dispensing unit into the recess, allowing access through the passage opening by removing or opening the closure element; and
enclosing the at least partially filled dosage-dispensing unit in the protective housing by connecting the bottom part with the top.

17. A method for dispensing a laboratory substance, comprising the steps of:
providing a container unit of claim 1, the container unit filled at least partially with the laboratory substance;
allowing access to the dosage-dispensing unit from the protective housing by separating the top from the bottom part;
connecting the dosage-dispensing unit to an actuating device and moving the dosage-dispensing unit into position above a receiving container;
dispensing at least one dosage of the laboratory substance from the dosage-dispensing unit into at least one receiver container;
disconnecting the dosage-dispensing unit from the actuating device after the dosages of laboratory substance have been dispensed; and
setting the dosage-dispensing unit into the recess of the bottom part, and enclosing the dosage-dispensing unit in the protective housing by connecting the bottom part with the top, providing a tightly-sealed interior space in the protective housing.

18. A method for monitoring a laboratory substance container unit according to claim 7, which has been filled and put into storage, comprising the steps of:
establishing and maintaining a measurement signal connection between the sensor and the monitoring unit;
receiving and recording measurement signals transmitted by the sensor;
comparing at least one received measurement signal or a measurement value obtained from the measurement signal, to at least one threshold value that is stored in the monitoring unit; and
transmitting a warning signal to an output unit in communication with the monitoring unit or the indicator, if the threshold value has been exceeded.

* * * * *